D. R. YARNALL.
WATER CONTROL FOR GRAVITY METERS.
APPLICATION FILED NOV. 8, 1912.
1,159,149.
Patented Nov. 2, 1915.
2 SHEETS—SHEET 1.
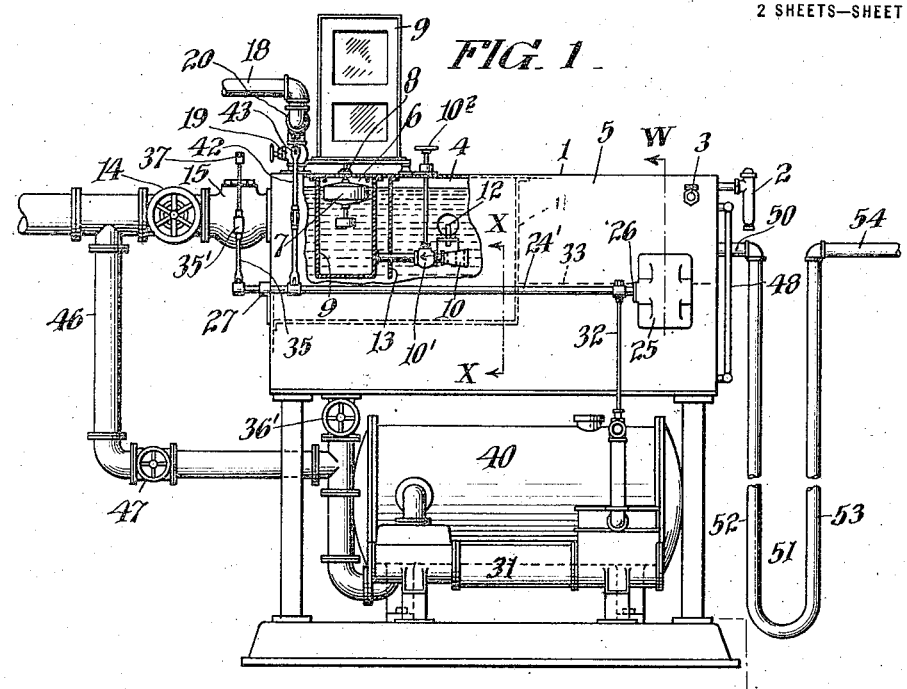
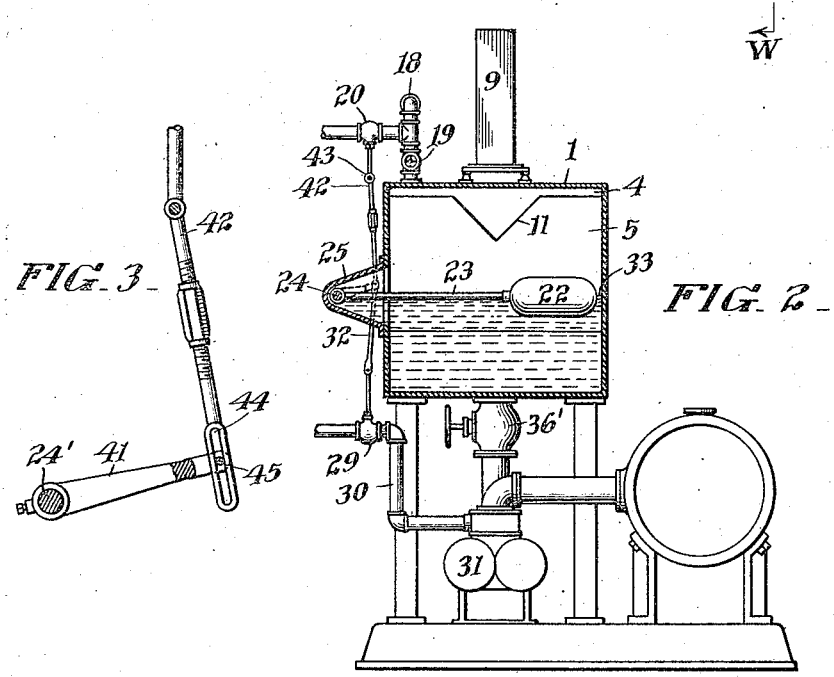
WITNESSES
INVENTOR
David Robert Yarnall
BY
Wm Steell Jackson
ATTORNEY

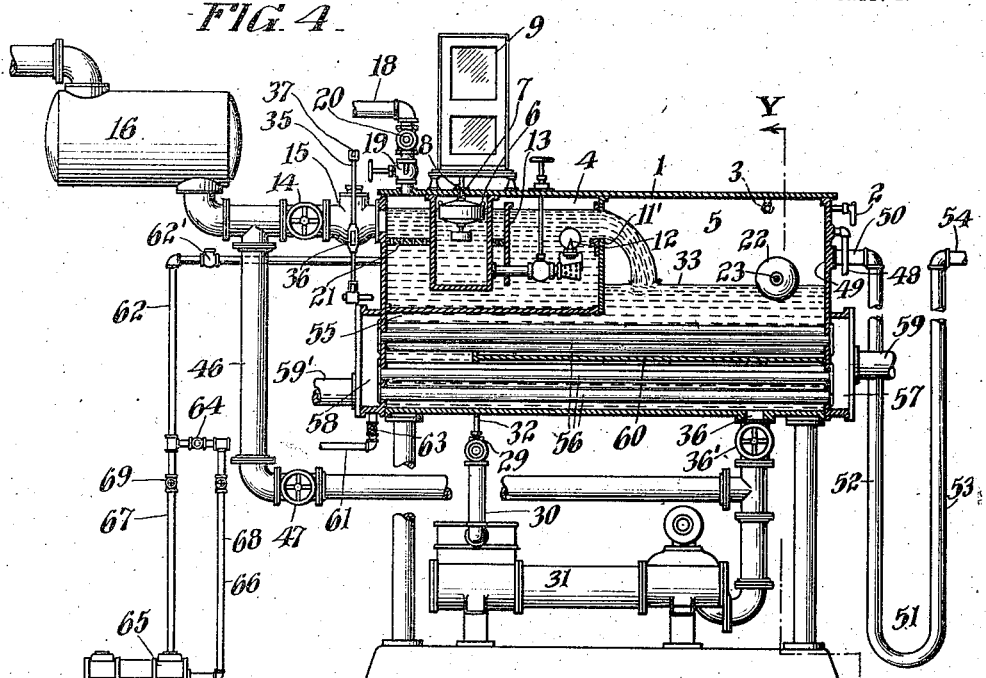

UNITED STATES PATENT OFFICE.

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA.

WATER CONTROL FOR GRAVITY-METERS.

1,159,149.     Specification of Letters Patent.     Patented Nov. 2, 1915.

Original application filed April 8, 1912, Serial No. 689,144. Divided and this application filed November 8, 1912. Serial No. 730,125.

*To all whom it may concern:*

Be it known that I, DAVID ROBERT YARNALL, a citizen of the United States, residing at Philadelphia, in the county of Philadelphia and State of Pennsylvania, have invented a certain new and useful Water Control for Gravity-Meters, of which the following is a specification.

The purpose of my invention is to maintain the level of the overflow from a gravity meter.

A further purpose of my invention is to provide positive control of the withdrawal of water from a meter storage compartment by automatic control of the pump.

A further purpose of my invention is to control the return and make-up water for any heater system proportionately to the height of water in the storage compartment in a preferably pressure-tight gravity meter.

A further purpose of my invention is to control the return water or feed water entering the meter, and preferably also the make-up water, where separately supplied, by the level of the water in the meter storage compartment.

A further purpose of my invention is to provide a meter in series with a preferably closed water heater, and to control the water admitted to the meter and, preferably, also the make-up water, in proportion to the height of water in the storage tank of the meter.

A further purpose of my invention is to control preferably all of the water-receiving and discharging functions of a meter by the height of water level in the storage compartment of the meter, starting the pump and stopping both main delivery and any make-up water supplied to the meter, with rise of storage compartment level, and vice versa.

A further purpose of my invention is to provide common control for all intake and storage water to and within a gravity meter, reciprocally reducing either, as the other is increased.

A further purpose of my invention is to make the withdrawal from the storage compartment of a gravity meter proportionate to the mean receipt of the intake water and, where admitted, the make-up water, smoothing out the measuring curve by averaging the supply of water to the receiving compartment of the meter. By making the speed of the pump correspond to the rate of evaporation in the boiler, i. e. to the mean return, the most economical results are obtained and the meter curve is rendered more nearly the same as the rate of boiler evaporation.

A further purpose of my invention is to equalize the flow of water through the system by retarding the inlet water when the water already in the meter becomes excessive and releasing the inlet water so retarded, as the water in the meter lowers.

A further purpose of my invention is to safeguard the level of water in a gravity meter storage chamber, by an overflow capable of continuous operation, acting as a blow-off at any predetermined pressure and affording a resilient cushion vapor seal at lower pressures.

A further purpose of my invention is to provide a protective, continuously operative overflow at the limit height of water in the storage compartment of a weir meter and to make use of it also as a safety valve, protecting both against excessive water height and excessive steam pressure.

I prefer to illustrate my invention by forms thereof which I have determined to be practical, efficient and relatively inexpensive, and which at the same time well illustrate the principles thereof.

Figure 1 is a broken side elevation of one form of my invention. Fig. 2 is a section upon the line $w$—$w$ of Fig. 1, looking in the direction of the arrows. Fig. 3 is a partial section on an enlarged scale upon the line $x$—$x$ of Fig. 1, looking in the direction of the arrows. Fig. 4 is a side elevation, partly in vertical longitudinal section, of a second form of my invention. Fig. 5 is a section of the structure of Fig. 4 upon line $y$—$y$ thereof, looking in the direction of the arrows. Fig. 6 is a side elevation of a third form of my invention.

Similar numerals of reference in the drawings indicate like parts.

This application is a division of my application for water meter control, filed April 8, 1912, Ser. No. 689,144.

In all of the forms of my invention I show a meter tank 1, preferably provided with thermostatic valve 2 and flap or vacuum-break valve 3, shown in my co-pending application, Serial Number 687,630, resulting in Patent No. 1,064,806, for fluid meter, filed April 1, 1912, for the purpose of exhausting the space within the compartments 4 and 5 of air, when the pressure within the meter casing exceeds atmospheric pressure, and of preventing vacuum within the chamber when connected so as to benefit from pressure conditions there, or, with reversed setting of the valve, for preventing pressure when intended for use with vacuum pans or surface condensers. The detail of these valve structures is not intended to be claimed independently by me, and for that reason they are not more fully illustrated. For their construction and use, further than here indicated, I would refer to my co-pending application above stated.

In all of the forms shown, of my invention, also, I have preferred to illustrate not only a gravity meter, but a meter of the weir type, whose upper or receiving chamber 4 and storage chamber 5 are in full communication at their upper ends for exchange of pressure, gas and vapor, so that the same conditions of pressure or vacuum are maintained throughout. The same is true of the float chamber 6 illustrated, whether this float chamber be actually within the meter casing, as illustrated and preferred, or not. It is intended to be kept in communication with the chamber 4 both above and below the water level. It contains the float 7 through whose rod 8 any form of recorder or integrator within the casing 9 may be operated, one form of which is fully disclosed in U. S. Patent to Lea 815,102.

In each of my forms, also, I prefer to introduce the water to the measuring tank through screened opening 10, controlled by valve 10' through handle 10². I have shown weirs 11, 11' and zero points 12 in line with a sight opening. I have used a baffle plate 13, to free the water in proximity to the weir from disturbance by the intake water.

In all of my forms I have preferred to introduce the intake water through a controlling valve 14 and to automatically control the admission of water by a valve 15, which will be more fully described hereafter. The intake water may be return water, coming from any part of a heating system, a condenser or feed water heater, or cold water supply, from whatever source. I have shown the intake without specific connection in Fig. 1; as connected through a receiving or storage equalizing tank 16 in Fig. 4; and as coming from an open water heater 17 in Fig. 6.

Where the feed water heater affords the supply it provides its own make-up and I have not separately indicated make-up water supply there.

I have shown my invention as applied to a system having a heater in series with or within the meter. Where the heater follows the meter, as in Fig. 1, or where the heater is located in part of one of the meter compartments, as in Fig. 4, and in any other locations where it would not throw cold water in an otherwise heated water supply, I prefer to admit the make-up water into the measuring meter compartment, as through pipe 18, controlled by hand valve 19, and preferably normally closed automatic valve 20, hereinafter more fully described. In this case I prefer to introduce it upon the opposite side from the weir of the baffle plate 13, so as to reduce the disturbing influence of the influx of water at this point. However, the quantity of make-up water used will be ordinarily very small and I prefer not to admit it until the low level of the water in the storage compartment indicates failure to receive sufficient supply from the "return" water.

The perforated plate 21 reduces water surging without interfering with the operation of the meter.

In all of the forms of my invention, I provide for control of the inlet and discharge water admitted to and taken from the weir tank, preferably using the same means for control of both. I have illustrated one form of this in a float 22 connected by lever arm 23 with a shaft 24 in a pocket 25. The rod passes out of the pocket near this connection and is packed at 26, so as to lie chiefly exterior to the tank, as at 24'. This shaft is supported in suitable bearing 27 and carries lever arms in proportion to the number of valves to be operated by it. Thus in all of the forms which I have shown, it starts, stops and regulates the pump by this means, controlling the discharge 36 through valve 36'. The connections shown are a lever 28 upon the rod, a valve 29 in the supply pipe 30 for the pump 31 and a rod 32 and valve stem 32' between whereby the pump may be started and stopped or controlled in the extent of its operation by reason of the rise or fall of the level 33 of the water in the storage compartment 5 of the meter.

In all of the forms shown, likewise, I have controlled the intake water similarly and have illustrated, for this purpose, as lever arm 34, upon the opposite side of the shaft from the lever arm 28. It operates a rod 35 adjustable by turn-buckle 35', whereby lever 37, pivoted at 38, is raised, lifting the stem 39 to open the valve 15 and admit additional intake water as the level of the water at 33 is reduced, or cut off the main intake supply of water as the height of water at 33 is increased.

In those forms in which the water heater lies in series with the meter, between it and the boiler, as with the closed feed water heater 40, the make-up water is preferably inserted directly within the measuring compartment of the meter and forms part of the intake of the meter. This make-up water is therefore also preferably controlled by the same means as that which controls the main intake, or by coincidentally operating means. I have preferred to control this by lever 41 upon the same shaft 24 as the other levers to which I have referred, and connect the lever 41 with the valve 20 by any suitable rod 42 and stem 43.

It will thus be seen that any increase in water level within the storage 5 will result in shutting off the supply of steam to the pump at the same time that the main intake valve is partially closed and that the make-up water, if inserted to the meter, may be correspondingly reduced or shut off.

In the form shown in Figs. 1 and 2, the discharge from the meter through valve 36' passes through the pump 31 to the heater 40, the pump thus being located between the meter and the heater; whereas, in the form shown in Fig. 6, the heater 17 supplies water to the meter and the pump follows the meter, the meter being between the pump and heater; and in the form shown in Fig. 4, the receiving or weir chamber of the meter precedes the heater and the pump follows both. My invention is applicable to all of these forms.

I prefer that the control of the make-up water should not be as sensitive as the control of the main intake and that the valve in the make-up water pipe shall be normally closed, in order that the make-up water may not be drawn upon to make up or equalize minor inequalities or delays in delivery of the return water, but may be drawn upon to make up permanent shortage and permanent shortage only. One construction which insures this operation of the normally closed make-up water valve 20 is shown. In it I provide a slot 44 in the lower end of the rod 42, so that the pin 45 upon the arm 41 may not engage the end of the slot until the level of the water at 33 becomes low enough to indicate a serious or permanent shortage of water.

The withdrawal of water from the catch basin by the pump, being normally more regular and uniform than the rate of flow of the return water to the receiving or weir compartment of the meter, high level of the water in the catch basin is usually due to an excessive rate of return water flow, causing an excessive height of water level in the weir chamber and consequently increased flow of water into the catch basin. The closing of the inlet valve by which the return water reaches the weir chamber when the catch water basin level rises, therefore banks up this return water in the forms shown in Figs. 4, 5 and 6, to be released when the catch basin level (and likewise normally the weir chamber level) is lowered, resulting in a considerable smoothing out effect in the fluctuation of the levels, both in the catch basin and weir chamber from the "pooling" or damming up of the return water in "flood" times and distribution of this water in the meter when the meter water level tends to lower. The reduction in fluctuation of the weir chamber level is highly beneficial in smoothing out the weir measuring curve, securing greater accuracy of measurement and supplying a more uniform flow into the catch basin for withdrawal by the pump.

It will be evident that I provide for pump operation substantially in proportion to the evaporation at the boiler, since I determine the pump operation by the mean return from the heating system. The make-up water applied is small.

To provide for repairs to the meter unit I have provided a by-pass 46 within which I have placed a valve 47.

The height of water in the storage chamber of the meter is shown in a gage glass 48.

While the automatic control of the main and make-up water intakes and the operation of the pump by the float 22 fully protect against flooding of the meter, whether weir, submerged orifice, or of any other gravity type, derangement of this automatic control might make further protection desirable or necessary, and I have, therefore, supplied additional protection which may be used as auxiliary to the automatic control indicated or may be advantageously employed when all or any part of the automatic control is not desired.

At any suitable upper water limit 49 I place an overflow pipe 50, which might be easily vented to the atmosphere but for the preferred use of my construction under pressure or vacuum meter conditions. I have accommodated this overflow to pressure or vacuum interchangeably at the same time that I have made it operative as a resilient safety valve, by connection thereto of a tube 51, comprising arms 52 and 53. I prefer to have the outlet 54, from arm 53, at the same level as the overflow opening 49, so that water will just flow out freely as the level of 49 is reached.

When the water lies below the level of the opening 49, this opening, and consequently the content of the tube, is exposed to whatever pressure or vacuum conditions are maintained within the meter casing. The protective action of the tube will be readily understood from the discussion of its operation under pressure. With a vacuum the conditions are reversed.

Whatever the pressure in the meter casing, the water in the arm 52 will be correspondingly depressed until the weight of the water in the unbalanced portion with 53 corresponding to the extent of depression of the water in the arm 52 equals the pressure within the meter casing. The static pressure of the unbalanced column of the water is thus used to counter-balance the pressure within the casing. Any increase of pressure within the casing will shove the water down a little farther in the arm 52, against a resilient or cushioned resistance, spilling a little more water out of the opening at 54, while a reduction of pressure within the casing will result in the unbalanced column within arm 53 being reduced as the water is forced up somewhat within arm 52. Unlike the ordinary safety valve, the pressure is relieved somewhat at and by the tube as the pressure approaches the limit at which it is intended to be released. The tube thus forms a vapor seal at all times unless and until the pressure within the meter tank exceeds the weight of the column of water within the arm 53 of the tube, at which time the vapor is given free access to the atmosphere through the tube. In the form shown in Fig. 4, this free vent of the meter casing, once begun, will continue until the tube is again filled with water. In Fig. 6 I have shown a different outlet 54' in the form of a container which may hold some water all of the time or not as desired, the normal level of the water being ordinarily that of the outlet opening from the tank. The tank receives any water forced upwardly through leg 53 of the tube and this water runs back into the tube when the pressure within the tank is again reduced. The temporary "storage" in the container of water originally in the tube will not prevent relief of excessive pressure in the tank by blowing steam through the tube to the atmosphere as this steam will pass through the water in the container freely. The overflow function will still be performed in this structure, as soon as the height of water within the tank reaches the height of the container walls, 54'. The pressure at which the vent may take place, i. e. the limit of pressure set for the interior of the meter casing, can be accurately predetermined by the height of the U tube.

In some forms of my invention it is highly desirable to make use of a portion of the meter for feed water heater purposes. While I have illustrated this feature here fully and will describe it, because it coöperates advantageously with the other structure here shown, and was in the application from which this application has been divided, I do not purpose claiming this heater here as it is claimed in the Patent No. 1,064,806, issued June 17, 1913. This is most advantageously done within the storage compartment, which can be extended beneath the receiving compartment corresponding to the construction of Fig. 1, to give additional length for the tubing and is desirably of good sized horizontal sectional area, as well as depth, readily accommodating the heater pipes. Either compartment, of course, could extend from wall to wall of the meter casing in either direction making it conveniently accessible for admission and discharge heater connections. My preferred heater, too, differs from usual closed heaters in that the steam passes through the pipes and the water surrounds them. It is further highly preferable to place the heating means in the storage compartment rather than the receiving compartment, since the water would otherwise have opportunity to cool in the relatively large storage required in the other compartment, which cannot be withdrawn too closely to the bottom, lest the pump be damaged by drawing air instead of water and racing correspondingly. I have therefore preferred to select the storage compartment for the location of my heater within the meter, and show steam tubes therefor.

In Fig. 4 I have shown the storage compartment as extended below the receiving and measuring compartment, as at 55, itself highly advantageous in increasing the storage without increase of floor space required, and have made use of a portion of this extended storage space, as well as a portion of the storage space not under the receiving and measuring compartment, for water heater purposes.

I have shown steam pipes 56 as extended from end to end of the meter casing, connecting with headers 57, 58 to form a closed feed water heater within the storage compartment. I supply preferably exhaust steam thereto by means of pipe 59 and withdraw the steam therefrom at 59'. I have considered the further detail of the heater steam connections as unnecessary since they would be the same as those of any separate closed feed water heater.

In order to insure circulation within the heater portion of the meter I have provided a longitudinal baffle plate 60 so that the water must pass from the right end, in the view, above the baffle plate around the end of the plate to the right end, in the view, below the baffle plate where discharge of the storage water thus heated, takes place. Assuming that the pressure within the closed water heater shown will normally exceed the pressure within the meter casing, I have provided for delivery of the water of condensation from the closed feed water heater to the receiving and measuring compartment of the meter by reason of this difference in pressures, connecting the header 57 with the receiving compartment of the meter, below the water level thereof, by piping shown at 61 and 62, check valved against return at 62'. It is valved at 63 and 64 so that a pump or return trap 65 and connections 66 and 67, valved at 68 and 69, may be used for delivery of this water to the meter compartment where the pressure does not accomplish this result.

The space between the tubes of the heater is utilized as storage space within the storage compartment of the meter without interference with its function as water space for heater purposes, resulting in considerable economy of space. Correspondingly, the same storage space can be obtained within the meter with but slight enlargement of the meter casing; the enlargement equaling the volume of the tubing only, greatly reducing the cost as well as the space required and making it possible to place a feed water heater on the same floor space already in use for the meter and at substantially the same elevation.

It will be evident that I have protected the storage side of a gravity meter against flooding or undue depression of water level by controlling all of the intake as well as the pump, at the same time that I have smoothed out the measuring curve and provided for boiler pump feed proportionate to the evaporation at the boiler.

It will be further evident that I have additionally protected against flooding by a water seal overflow, forming a resilient safety valve for the vapor pressure preferably maintained within my meter casing.

Having thus described my invention, what I claim as new and desire to secure by Letters Patent is:—

1. In a gravity meter, a meter tank having receiving and storage compartments, having different water level and free gravity flow therebetween, a water supply compartment providing an equalizing tank for water supply to the meter, an intake for the meter therefrom, a discharge pipe from the storage compartment, a float operated by the water in the storage compartment of the meter, a boiler feeding device connected with the discharge pipe and connections from the float controlling the intake and the feeding device to limit the introduction of water through the intake and start the device with increase of water in the storage compartment.

2. In a device of the character stated, a tank having a receiving compartment, an intake connection therewith, a storage compartment in the tank extended beneath the receiving compartment, a boiler feeding device connected with the storage compartment and means for controlling the operation of the feeding device by the height of water in the storage compartment.

3. In a device of the character stated, a receiving compartment, return and make-up water connections for said receiving compartment, a storage compartment having a water level below that of the receiving compartment, a discharge connection therefrom, a boiler feeding device connected to the said discharge connection and means for controlling the admission of return and make-up water and the operation of the feeding device with differences in height of the water in the storage compartment, to admit more water and cut down the operation of the device as the level in the storage compartment is reduced and to pump more water and shut off the inlet supply as said water level is raised.

4. In a device of the character stated, a tank having a receiving and measuring compartment, return water supply connection therefor, a storage compartment within the tank extended beneath the receiving compartment and having a different water level therefrom, a discharge connection therefrom, a boiler feeding device connected to the discharge compartment and a float and connections for controlling the operation of the device in proportion to the mean supply of return water to the receiving compartment.

5. In a device of the character stated, a tank having a receiving and measuring compartment, return water supply connection therefor, a storage compartment within the tank and having a different water level therefrom, a discharge connection therefrom, a boiler feeding device connected to the discharge compartment and a float and connections for controlling the operation of the device in proportion to the mean supply of return water to the receiving compartment.

6. In a device of the character stated, a receiving and measuring compartment, a return water connection therefor, including a tank adapted to act as a reservoir for the return water, a valve in said connection located between the tank and the receiving compartment, a storage compartment having a water level different from that of the receiving compartment, a discharge connection therefor, a boiler feeding device connected with said discharge connection, a valve controlling said feeding device, a float in the storage compartment, and connections from said float to the two valves to reduce or stop the return water supply and start the feeding device, with increase of water level in the storage compartment.

7. In a device of the character stated, a receiving and measuring compartment, return water and make-up connections thereto, a valve in each connection, a storage compartment having a water level different from that of the receiving compartment, a discharge connection therefrom, a boiler feeding device connection with said discharge pipe, a float in the storage compartment and connections from the float to the two valves and feeding device whereby the valves are opened and the feeding device shut off with loss of water level in the storage compartment.

8. In a device of the character stated, a compartment receiving a variable quantity of water, a receiving and measuring meter compartment directly connected therewith, a valve in the connection, a make-up water connection for the meter compartment, a valve in this connection, a storage compartment in the meter, a discharge connection from the storage compartment, a pump therein, a float in the storage compartment and connections between the float and the pump and two valves to control their operation, starting the pump and closing the valves as the storage water increases in height.

9. In a device of the character stated, a meter receiving compartment, return water connection therefor, a valve in the connection, a storage meter compartment extending under the receiving compartment, a discharge connection for the storage compartment, a pump in the discharge connection, a float in the storage compartment and means between the float and return water connection and pump starting the pump and closing the valve to back up the return water as the level in the storage compartment rises.

10. In a device of the character stated, a meter receiving compartment, a return water connection therefor, a valve in the connection, a storage meter compartment, a discharge connection for the storage compartment, a pump in the discharge connection, a float in the storage compartment and means between the float and return water connection and pump starting the pump and closing the valve to back up the return water as the level in the storage compartment rises.

11. In a device of the character stated, a weir meter having a receiving compartment and a catch basin, a float in the catch basin, an inlet connection for the receiving compartment, an outlet connection from the catch basin and a controller connected with the float for regulating the withdrawal of fluid through the outlet connection in proportion to the height of the float.

12. In a device of the character stated, a weir meter having a receiving compartment and a catch basin, a main inlet connection to the receiving compartment, a source of irregular water supply for said inlet connection, a discharge connection from the catch basin, a float in the catch basin and means connected with the float for regulating the passage of water through the inlet connection and the withdrawal of water from the catch basin by the level of water in the catch basin to reduce the fluctuation of water flowing.

DAVID ROBERT YARNALL.

Witnesses:
HELEN I. KAUFFMAN,
WM. STEELL JACKSON.